US009019899B2

(12) United States Patent
Doyle (10) Patent No.: US 9,019,899 B2
(45) Date of Patent: Apr. 28, 2015

(54) METHOD AND APPARATUS FOR SYNCHRONOUS COMMUNICATION OF FRAMES OF DIGITAL INFORMATION

(75) Inventor: Chris Doyle, Dunrobin (CA)

(73) Assignee: Alcatel Lucent, Boulogne-Billancourt (FR)

( * ) Notice: Subject to any disclaimer, the term of this patent is extended or adjusted under 35 U.S.C. 154(b) by 2477 days.

(21) Appl. No.: 10/154,657

(22) Filed: May 24, 2002

(65) Prior Publication Data

US 2003/0128719 A1 Jul. 10, 2003

Related U.S. Application Data

(60) Provisional application No. 60/325,400, filed on Sep. 27, 2001.

(51) Int. Cl.
*H04W 4/00* (2009.01)
*H04L 7/00* (2006.01)
*H04J 3/06* (2006.01)
*H04W 72/00* (2009.01)

(52) U.S. Cl.
CPC .............. *H04L 7/0008* (2013.01); *H04J 3/0605* (2013.01)

(58) Field of Classification Search
USPC .......................... 370/395.1, 395.62, 392, 503
See application file for complete search history.

(56) References Cited

U.S. PATENT DOCUMENTS

| 4,594,708 | A | * | 6/1986 | Servel et al. ................. 370/504 |
| 4,719,643 | A | * | 1/1988 | Beeman ........................ 375/367 |
| 4,752,923 | A | * | 6/1988 | Allen et al. .................... 370/538 |
| 5,200,979 | A | * | 4/1993 | Harris ............................ 375/292 |
| 5,260,936 | A | * | 11/1993 | Bardet et al. ................... 370/428 |
| 5,619,361 | A | * | 4/1997 | Sagesaka et al. .............. 398/127 |
| 5,675,617 | A | * | 10/1997 | Quirk et al. .................... 375/365 |
| 5,809,022 | A | * | 9/1998 | Byers et al. ............... 370/395.51 |
| 5,875,202 | A | * | 2/1999 | Venters et al. ................. 714/807 |
| 6,005,871 | A | * | 12/1999 | Petersen et al. .......... 370/395.64 |
| 6,157,635 | A | * | 12/2000 | Wang et al. .................... 370/352 |
| 6,708,233 | B1 | * | 3/2004 | Fuller et al. ..................... 710/22 |
| 6,925,072 | B1 | * | 8/2005 | Grohn ............................ 370/336 |
| 7,010,613 | B2 | * | 3/2006 | Connor ......................... 709/236 |
| 7,191,240 | B1 | * | 3/2007 | Johnson ........................ 709/230 |
| 7,215,670 | B1 | * | 5/2007 | Karlsson et al. ............ 370/395.1 |
| 7,342,897 | B1 | * | 3/2008 | Nader et al. ................... 370/255 |
| 2001/0043603 | A1 | * | 11/2001 | Yu ................................. 370/393 |
| 2002/0001315 | A1 | * | 1/2002 | Tran et al. ..................... 370/475 |
| 2002/0009232 | A1 | * | 1/2002 | Sodagar et al. ............... 382/232 |
| 2002/0166012 | A1 | * | 11/2002 | Natarajan et al. ............. 710/100 |
| 2004/0240435 | A1 | * | 12/2004 | Boucher et al. ............... 370/352 |
| 2005/0069041 | A1 | * | 3/2005 | Lincoln ......................... 375/257 |

* cited by examiner

*Primary Examiner* — Ayaz Sheikh
*Assistant Examiner* — Sori Aga
(74) *Attorney, Agent, or Firm* — Kramer Amado, P.C.

(57) ABSTRACT

A method and apparatus for synchronous communication of frames of serial data is provided. A framing pattern and data payloads are communicated over a first communication path. A clock signal is communicated over a second communication path. The clock signal is synchronous to the data to allow easy data recovery at the receiver. The framing pattern is communicated between each data payload. The framing pattern has a length greater than the length of each data payload. The framing pattern includes one or more bits of a first logic level followed contiguously by one or more bits of a second logic level. Since the framing pattern is longer than each data payload, a data payload can never contain sufficient information to mimic a framing pattern. A transmitter and a receiver are provided that avoid the need for complex circuitry while readily identifying any communication path failures so as to prevent propagation of erroneous data.

56 Claims, 6 Drawing Sheets

METHOD AND APPARATUS FOR SYNCHRONOUS COMMUNICATION OF FRAMES OF DIGITAL INFORMATION

RELATED APPLICATIONS

This application claims the benefit of U.S. Provisional Application No. 60/325,400, filed Sep. 27, 2001.

FIELD OF THE DISCLOSURE

The present invention relates generally to communication of digital information, and more particularly to a method and apparatus for synchronous communication of frames of digital information.

BACKGROUND

It is often desirable to communicate digital information in frames of fixed length. To avoid the need for large numbers of parallel communication paths, information is often transmitted in a serial form, with the several bits of data of a frame communicated in a temporally sequential manner.

It is possible to communicate frames of data over a single communication path, such as a single wire, optical path, or other medium. However, such a one-wire solution requires a complex analog clock recovery circuit. Also, large, complicated state machines are required for framing pattern detection. Additionally, complicated state machines are required to reduce the possibility of false "frame lock" due to a data frame that happens to mimic a framing pattern. Consequently, the complexity and associated expense of a one-wire technique makes it a less than ideal solution.

Another approach involves three parallel communication paths, which one path dedicated to communicating the data, a second path dedicated to communicating a frame pulse, and a third path dedicated to communicating a clock signal. While the separation of the data, frame pulse, and clock signal avoid the need for complex circuits required for the one-wire technique, this separation results in three times as many communication paths needed to communicate the information. Thus, for any given likelihood that a communication path will fail, a three-wire solution has a much greater likelihood of system failure. Proper handling of a communication path failure is also much more complex. For example, if only one or two of the three communication paths were to fail, it could be difficult to detect the exact nature of the communication path failure, and erroneous data may be propagated at the receiver output. Thus, the design of the receiver necessarily becomes complicated if the receiver is required to handle three possible failure modes in a manner such that erroneous data is not propagated. Therefore, a three-wire technique can result in reduced reliability, availability, and serviceability, where availability is defined as the ability to detect a failure quickly and serviceability is defined as the ability to detect which communication path has failed. Consequently, the three-wire technique provides a less than ideal solution.

Thus, a solution is needed that avoids the complex circuitry of the one-wire technique and the reduced reliability, availability, and serviceability of the three-wire technique.

DETAILED DESCRIPTION OF THE FIGURES

A method and apparatus for synchronous communication of frames of serial data is described. A framing pattern and data payloads are communicated over a first communication path. A clock signal is communicated over a second communication path. The clock signal is synchronous to the data to allow easy data recovery at the receiver. The framing pattern is communicated between each data payload. The framing pattern has a length greater than the length of each data payload. The framing pattern includes one or more bits of a first logic level followed contiguously by one or more bits of a second logic level. Since the framing pattern is longer than each data payload, a data payload can never contain sufficient information to mimic a framing pattern. A transmitter and a receiver are provided that avoid the need for complex circuitry while readily identifying any communication path failures so as to prevent propagation of erroneous data. An embodiment of the invention allows communication of frames of time division multiplexed (TDM) data, wherein several frames of data that may belong to several independent data flows may be communicated over a common channel by sequencing the several frames of data in time. In accordance with an embodiment of the invention, demarcation between these several frames of data is efficiently provided.

Figure 1:
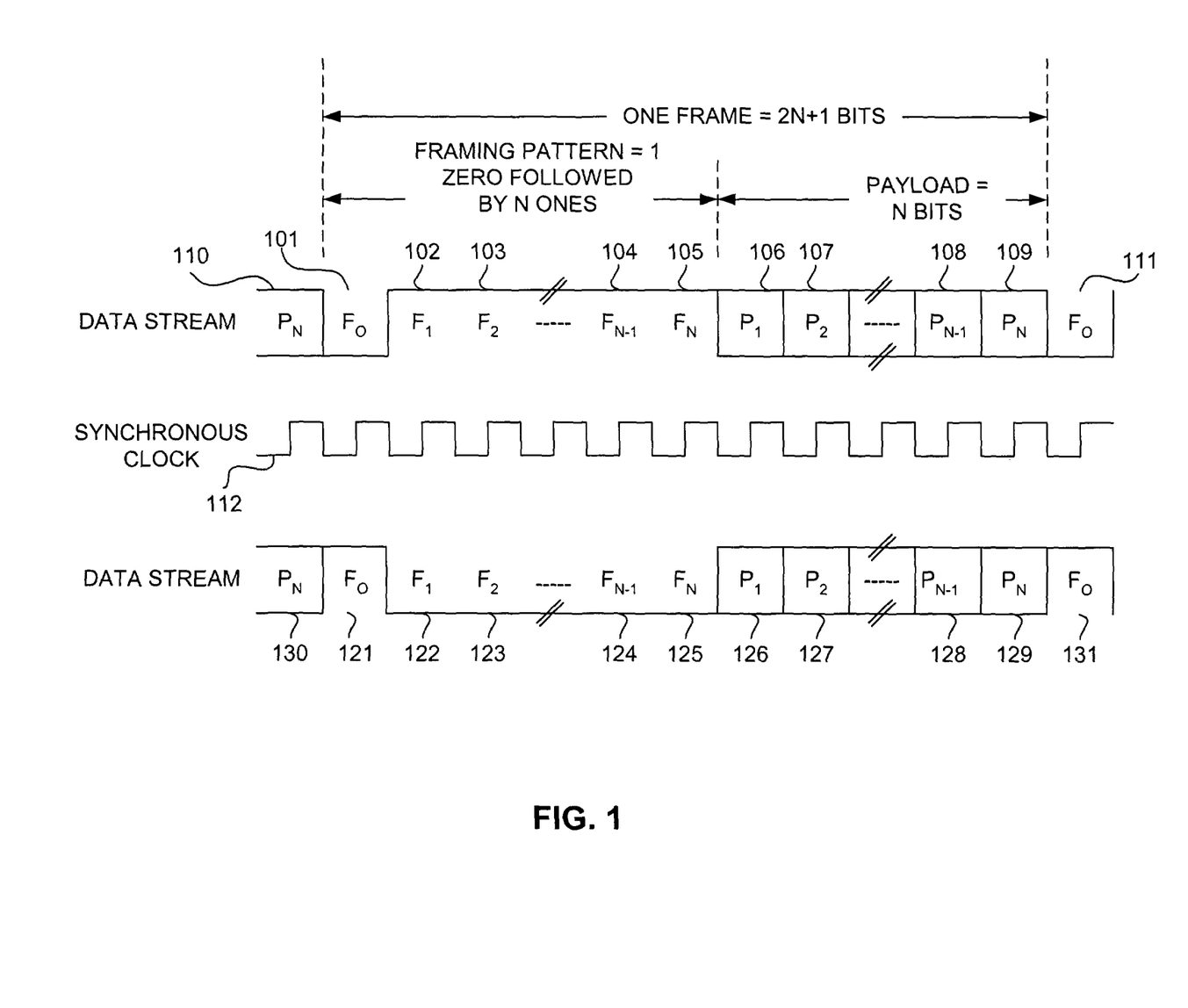
FIG. 1 is a timing diagram illustrating two embodiments of a data stream in accordance with the present invention.

FIG. 1 is a timing diagram illustrating two embodiments of a data stream in accordance with the present invention. The data stream includes frames of information. Each frame includes a framing pattern and a data payload. In the first embodiment, the framing pattern includes bits 101 through 105. In this example, bit 101 represents a logical zero, while bits 102 through 105 represent logical 1's. The data payload includes bits 106 through 109. Bits 106 through 109 consist of n bits, and bits 102 through 105 of the framing pattern comprise n bits. Since the framing pattern includes bit 101 in addition to bits 102 through 105, the framing pattern will always be longer than the data payload. Bits 101 through 105 of the framing pattern are contiguously sequential. Bits 106 through 109 of the data payload are contiguously sequential. The framing pattern is contiguously sequential with the data payload. Bit 111 represents a bit of a framing pattern of an adjacent frame. Thus, it can be seen that the data payload is contiguously sequential with a framing pattern of an adjacent frame. Bit 110 represents a bit of a data payload of an adjacent frame. Thus, it can be seen that the framing pattern is contiguously sequential with a data payload of an adjacent frame. Synchronous clock signal 112 is illustrated in its temporal relationship with the data stream of the first embodiment. As can be seen, if the data stream is sampled on the rising edge of synchronous clock 112, the data of the data stream may be synchronously recovered at the receiver.

A second embodiment of a data stream is also illustrated in FIG. 1. In this embodiment, the framing pattern includes bits 121 through 125, and the data payload includes bits 126 through 129. In this example, bit 121 is of a logic level similar to that of bits 102-105 in the above example, and bits 122 through 125 are of a logic level similar to that of bit 101 in the above example. Bit 130 represents a bit of a data payload of an adjacent frame, and bit 131 represents a bit of a framing pattern of an adjacent frame. As illustrated, bits 121 through 131 are contiguously sequential. Thus, it can be seen that the invention is not limited to the use of specific logic levels for bit 101 and bits 102-105 or for bit 121 and bits 122-125. Rather, any distinguishable logic levels may be used. Consequently, use of the terms "first logic level" or "first polarity" and "second logic level" or "second polarity" herein should be understood to represent logic levels that may be distinguished from one another, without placing further constraints on either logic level.

The broken lines between bits 103 and 104, between bits 107 and 108, between bits 123 and 124, and between bits 127 and 128 illustrated that the framing pattern length and the data payload length may be varied while maintaining the relationship between the framing pattern and the data payload that allows them to be distinguished from one another. Thus, the examples illustrated in FIG. 1 are not intended to imply a specific length (or a minimum or maximum length) for the framing pattern or a data payload.

Other variants of a data stream in accordance with an embodiment of the invention include those in which the bits of the framing pattern are temporally reversed with respect to the examples illustrated in FIG. 1. As one example, bits temporally corresponding to bits 101-104 are of a logic level similar to that of bit 101 in the above example of FIG. 1, and a bit temporally corresponding to bit 105 is of logic level similar to that of bits 102-105 in the above example of FIG. 1. In another example, bits temporally corresponding to bits 101-104 are of a logic level similar to that of bits 102-105 in the above example of FIG. 1, and a bit temporally corresponding to bit 105 is of a logic level similar to that of bit 101 in the above example of FIG. 1. Thus, the framing pattern may comprise any of a variety of patterns that allow the framing pattern to be readily distinguished from a data payload.

As another, more general, example, any framing pattern exhibiting only one transition from a given logic level to a different logic level may be used. Such a framing pattern may include a contiguous first number of bits of the given logic level followed by a contiguous second number of bits of the different logic level, wherein the sum of the first number of bits and the second number of bits is greater than the number of bits in the data payload that is transmitted between two instances of the framing pattern. While the framing pattern may remain the same from one instance to the next, by configuring a transmitter to produce framing patterns exhibiting only one transition and configuring a receiver to detect framing patterns based on their single transition, the present invention may be practiced with framing patterns wherein the actual sequence of bits that constitute an instance of the framing pattern may vary from instance to instance.

If the framing pattern is longer than any data payload, no data payload can mimic the framing pattern, and misidentification of bits of the framing pattern and bits of a data payload can be avoided. By using a framing pattern having a contiguously sequential plurality of bits of a similar logic level, with that plurality of bits contiguously sequential with a bit of a different logic level, not only can the framing pattern, as a whole, be distinguished from any data payload, but alignment of the bits of the framing pattern and bits of a data payload can be identified without ambiguity. Therefore, even if, for example, bit 106 were of a similar logic level to bit 105, the demarcation of the framing pattern and the data payload between bit 105 and bit 106 can be unambiguously identified.

Figure 2:
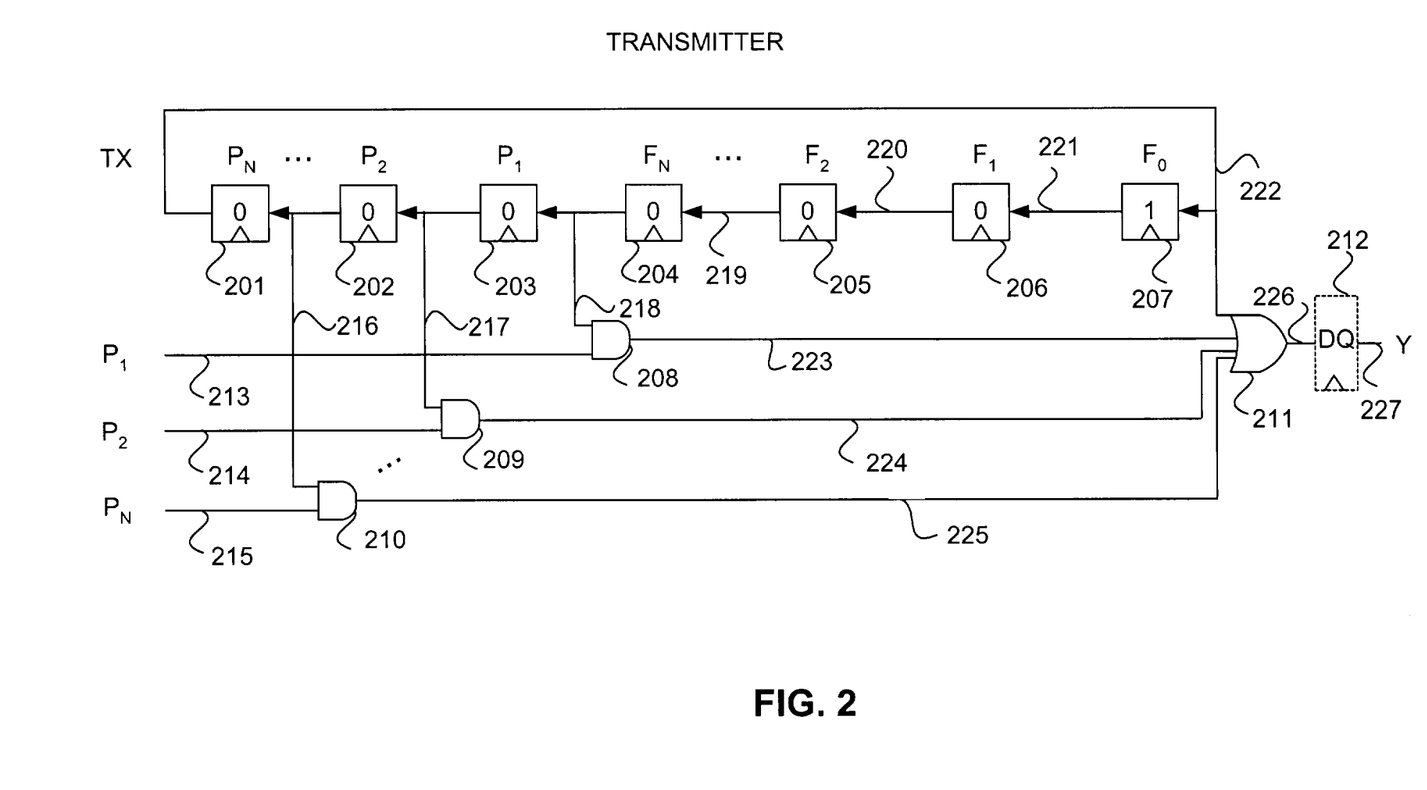
FIG. 2 is a logic diagram illustrating a transmitter in accordance with an embodiment of the present invention.

FIG. 2 is a logic diagram illustrating a transmitter in accordance with an embodiment of the present invention. The transmitter includes a payload transmission circuit for accepting a payload of data to be transmitted. The payload includes a plurality of payload bits. The payload transmission circuit causes the payload bits to be transmitted during payload time slots. The transmitter also includes a framing pattern transmission circuit coupled to the payload transmission circuit. The framing pattern transmission circuit causes a framing pattern to be transmitted during framing pattern time slots. The framing pattern has a framing pattern length greater than a payload length of the payload. The transmitter also includes a merging circuit. The merging circuit couples the payload transmission circuit and the framing pattern transmission circuit. The merging circuit merges the payload and the framing pattern to provide a data signal.

The payload transmission circuit includes combinational logic devices, for example, AND gates 208-210. The framing pattern transmission circuit includes sequential logic devices, for example, D flip flops 204-207. The payload transmission circuit further includes sequential logic devices, for example, D flip flops 201-203. The merging circuit includes a combinational logic device, for example, OR gate 211.

A shift register comprising D flip flops 201 through 207 is provided. The output of D flip flop 202 is coupled via coupling 216 to the input of D flip flop 201. The output of D flip flop 203 is coupled via coupling 217 to the input of D flip flop 202. The output of D flip flop 204 is coupled via coupling 218 to the input of D flip flop 203. The output of D flip flop 205 is coupled via coupling 219 to the input of D flip flop 204. The output of D flip flop 206 is coupled via coupling 220 to the input of D flip flop 205. The output of D flip flop 207 is coupled via coupling 221 to the input of D flip flop 206. The output of D flip flop 201 is coupled via coupling 222 to the input of D flip flop 207. Thus, the shift register output is coupled to the shift register input, forming a feedback loop around the shift register. Coupling 216 is also coupled to an input of AND gate 210. Coupling 217 is also coupled to an input of AND gate 209. Coupling 218 is also coupled to an input of AND gate 208. Coupling 222 is also coupled to an input of OR gate 211. An input 213 carrying a first bit of a data payload is coupled to an input of AND gate 208. An input 214 carrying a second bit of a data payload is coupled to an input of AND gate 209. An input 215 carrying an nth bit of a data payload is coupled to an input of AND gate 210.

An output 223 of AND gate 208 is coupled to an input of OR gate 211. An output 224 of AND gate 209 is coupled to an input of OR gate 211. An output 225 of AND gate 210 is coupled to an input of OR gate 211. An output 226 of OR gate 211 is coupled to an input of D flip flop 212. Output 227 of D flip flop 212 provides a data stream, for example a data stream such as those illustrated in FIG. 1. While FIG. 2 illustrates an example for a three-bit data payload, any length of data payload may be accommodated by changing the number of D flip flops in the shift register and the number of AND gates to which they are coupled, as well as the corresponding inputs for the AND gates, as illustrated by ellipses in FIG. 2. The shift register of FIG. 2 is provided with a preload capability allowing specific values to be preloaded into each of the D flip flops 201 through 207. As one example, D flip flops 201 through 206 are illustrated as being preloaded with zeros, and D flip flop 207 is illustrated as being preloaded with a one. D flip flop 212 is optional and, while preferred, may be omitted.

A common clock signal is preferably used to clock D flip flops 201-207 and 212. This common clock signal is preferably communicated over a clock conductor of a bus between the transmitter and a receiver, while the data stream from the transmitter is communicated over a data conductor of the bus. Thus, communication between the transmitter and a receiver may be provided using only two conductors, for example, two wires.

Figure 3:
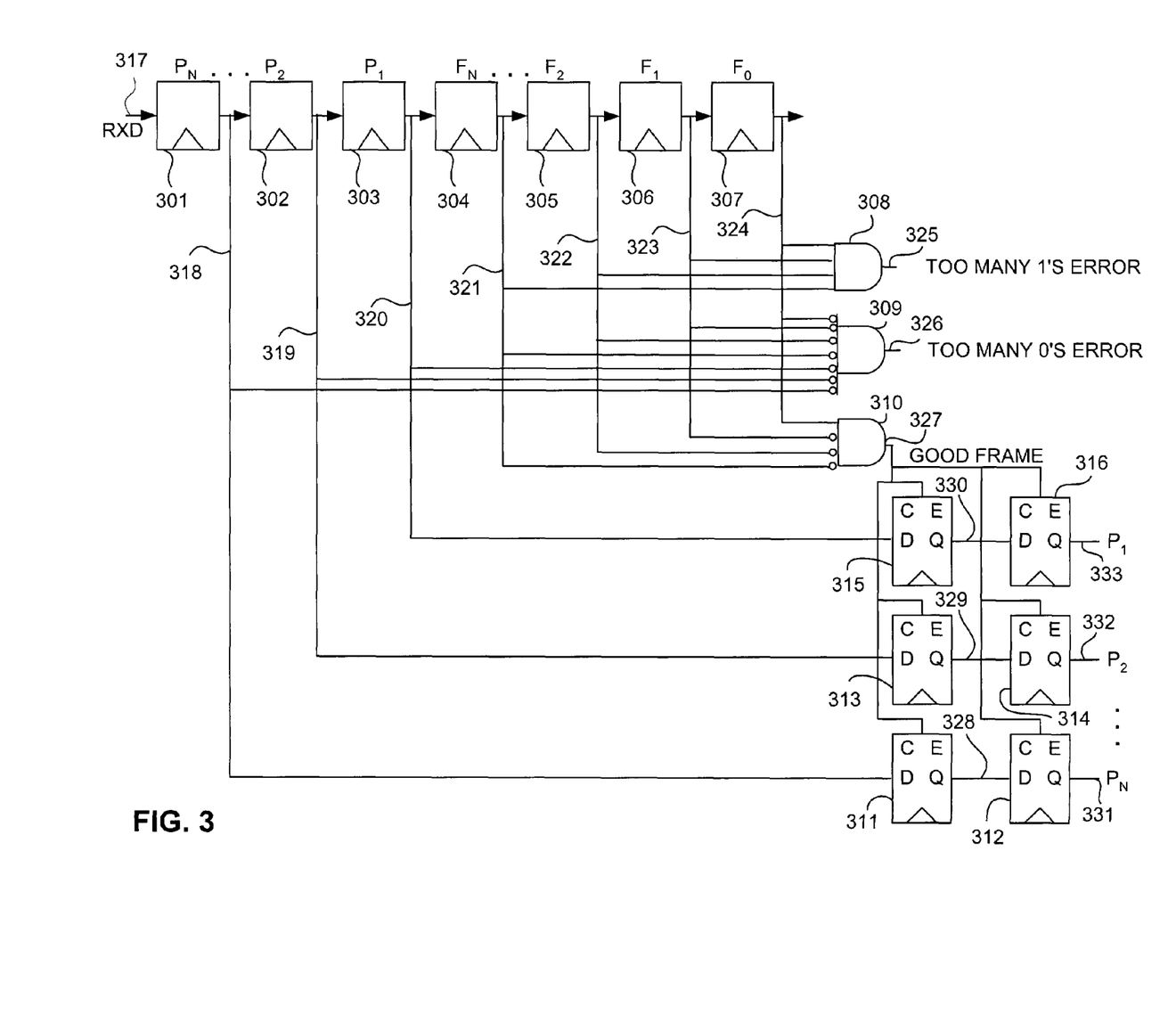
FIG. 3 is a logic diagram illustrating a receiver in accordance with an embodiment of the present invention.

FIG. 3 is a logic diagram illustrating a receiver in accordance with an embodiment of the present invention. The receiver includes a payload reception circuit for receiving a payload of data from a data signal. The payload includes a plurality of payload bits communicated during payload time slots. The receiver also includes a framing pattern reception circuit coupled to the payload reception circuit. The framing pattern reception circuit receives a framing pattern from the data signal during framing pattern time slots. The framing pattern has a framing pattern length greater than a payload length of the payload. The receiver also includes a payload output circuit coupled to the payload reception circuit and to the framing pattern reception circuit. The payload output circuit outputs the payload upon reception of the framing pattern and the payload. The receiver also includes an error detection circuit comprising a too many 1's error detector and a too many 0's error detector coupled to the payload reception circuit and to the framing pattern reception circuit. The error detection circuit provides the ability to detect error conditions. For example, the error detection circuit can provide a too many ones error indication upon detection of too many logical ones. As another example, the error detection circuit can provide a too many zeros error indication upon detection of too many logical zeros. Of course, these indications can be combined with an OR logic gate to provide a bad frame indication if a simple indication of a faulty frame is desired. The receiver also includes a good frame detector for detecting valid framing of payloads.

The payload reception circuit includes sequential logic devices, for example, D flip flops 301-303. The framing pattern reception circuit includes sequential logic devices, for example, D flip flops 304-307. The framing pattern reception circuit further includes a combinational logic device, for example, AND gate 310. The payload output circuit further includes sequential logic devices, for example, D flip flops 311-316.

A data stream is received at input 317. Input 317 is coupled to D flip flop 301. D flip flops 301 through 307 serve as a shift register. The output of D flip flop 301 is coupled via coupling 318 to an input of D flip flop 302. The output of D flip flop 302 is coupled via coupling 319 to an input of D flip flop 303. The output of D flip flop 303 is coupled via coupling 320 to an input of D flip flop 304. The output of D flip flop 304 is coupled via coupling 321 to an input of D flip flop 305. The output of D flip flop 305 is coupled via coupling 322 to an input of D flip flop 306. The output of D flip flop 306 is coupled via 10 coupling 323 to an input of D flip flop 307. The output of D flip flop 307 is coupled via coupling 324.

Coupling 318 is also coupled to an inverting input of AND gate 309 and to an input of D flip flop 311. Coupling 319 is also coupled to an inverting input of AND gate 309 and to an input of D flip Flop 313. Coupling 320 is also coupled to an inverting input of AND gate 309 and to an input of D flip flop 315. Coupling 321 is also coupled to an input of AND gate 308, to an inverting input of AND gate 309, and to an inverting input of AND gate 310. Coupling 322 is also coupled to an input of AND gate 308, to an inverting input of AND gate 309, and to an inverting input of AND gate 310. Coupling 323 is also coupled to an input of AND gate 308, and inverting input of AND gate 309, and an inverting input of AND gate 310. Coupling 324 is coupled to an input of AND gate 308, to an inverting input of AND gate 309, and to an input of AND gate 310.

The too many 1's error detector comprises AND gate 308, which provides output 325 to indicate a too many 1's error. The too many 0's error detector comprises AND gate 309, which provides an output 326 to indicate a too many 0's error. The good frame detector comprises AND gate 310, which provides an output 327 to indicate a good frame. Output 327 is coupled to a clock enable input of each of D flip flops 311 through 316. The output of D flip flop 311 is coupled to an input of D flip flop 312. The output of D flip flop 312 is provided at output 331, representing the nth bit of the data payload. The output of D flip flop 313 is coupled via coupling 329 to an input of D flip flop 314. The output of D flip Flop 314 is provided at output 332, representing the second bit of the data payload. The output of D flip flop 315 is coupled via coupling 330 to the input of D flip flop 316. The output of D flip flop 316 is provided at output 333, representing the first bit of the data payload.

The receiver is preferably coupled to a transmitter by a bus comprising two conductors, for example, two wires. While one conductor is used to communicate a data signal including the framing pattern and the payload, another conductor is used to communicate a clock signal. This clock signal is preferably used to clock D flip flops 301-307 and 311-316. Thus, the transmitter and receiver can operate synchronously using the same clock signal.

While FIG. 3 illustrates an example for a three-bit data payload, any length of data payload may be accommodated by changing the number of D flip flops in the shift register and the number of D flip flops and AND gate inputs to which they are coupled, as illustrated by ellipses in FIG. 3. Other techniques for identifying too many 1's errors or too many 0's errors may be used. For example, to identify too many 1's errors, an AND gate having more inputs may be used and/or AND gate inputs may be coupled to outputs of different D flip-flops in the shift register.

In the example of FIG. 3, the too many 1's error detector identifies too many 1's errors that occur when (n+1) or more consecutive 1's are received, a too many 0's error detector identifies too many 0's errors that occur when (2n+1) or more consecutive 0's are received, and the good frame detector identifies when a good frame is received by detecting a consecutive pattern of a 1 followed by n 0's. While, in that example, the too many 1's error detector, the too many 0's error detector, and the good frame detector are described in a manner compatible with a framing pattern having a 1 followed by n 0's, the specific logic circuits used to implement the too many 1's error detector, the too many 0's error detector, and the good frame detector may be configured to accommodate any framing patterns with which the invention may be practiced. As one example, the receiver can accommodate a framing pattern of opposite logic levels if the inputs of AND gates 308-310 are inverted from the configuration in which they are illustrated in FIG. 3. The receiver can accommodate a framing pattern temporally reversed from that for which the example in FIG. 3 is designed simply by inverting the inputs of AND gate 310 coupled to couplings 321 and 324 from the sense in which they are illustrated in FIG. 3. Thus, corresponding to the example illustrated in FIG. 3, the input of AND gate 310 coupled to coupling 321 would be changed to a non-inverting input, and the input of AND gate 310 coupled to coupling 324 would be changed to an inverting input.

In the example illustrated in FIG. 3, it should be understood that D flip flops 312, 314, and 316 maybe considered to be optional. D flip flops 312, 314, and 316 ensure that a payload is propagated to their outputs 331, 332, and 333, respectively, only if the framing pattern received following the payload is determined to be valid. D flip flops 311, 313, and 315 ensure that the payload is propagated to their outputs 328, 329, and 330, respectively, only if the framing pattern preceding the payload is determined to be valid. By implementing all of D flip-flops 311-316, assurance is provided that the payload is only propagated to outputs 331, 332, and 333 when the framing patterns surrounding (i.e., before and after) the payload are valid. If D flip flops 312, 314, and 316 were omitted, only the framing pattern preceding the payload would be checked for validity before the payload were propagated.

While FIGS. 2 and 3 provide simple examples of a transmitter and receiver in accordance with an embodiment of the invention, it should be understood that transmitters and receivers in accordance with embodiments of the invention may be implemented in many other ways. In another example, D flip flops 201-203 are transposed with D flip-flops 204-207, and D flip flops 301-303 are transposed with D flip flops 304-307. As noted above, the transmitter and receiver may be readily scaled to accommodate any number of bits in a data payload. While transmitters and receivers in accordance with an embodiment of the invention may be implemented with few logic devices, as illustrated in FIGS. 2 and 3, it should be understood that transmitters and receivers of other levels of complexity, for example, those having more logic devices or other components, may be implemented.

Figure 4:
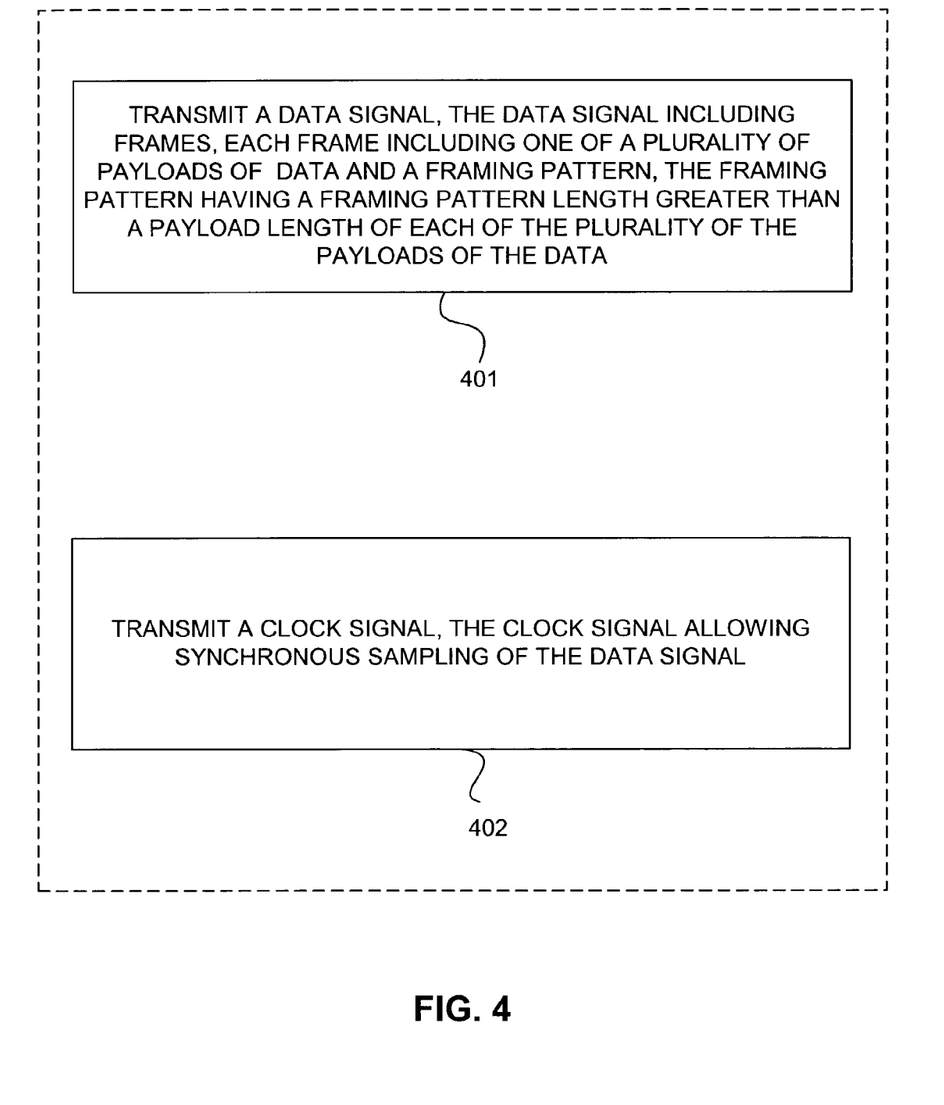
FIG. 4 is a flow diagram illustrating a method for transmitting a data signal and a clock signal in accordance with an embodiment of the invention.

FIG. 4 is a flow diagram illustrating a method for transmitting a data signal and a clock signal in accordance with an embodiment of the invention. In step 401, a data signal is transmitted. The data signal includes frames. Each frame includes one of a plurality of payloads of data and a framing pattern. The framing pattern has a framing pattern length that is greater than a payload length of each of the plurality of the payloads of the data. In step 402, a clock signal is transmitted. The clock signal allows synchronous sampling of the data signal. Since the data signal is synchronous with the clock signal, both steps 401 and 402 preferably occur at the same time.

Figure 5:
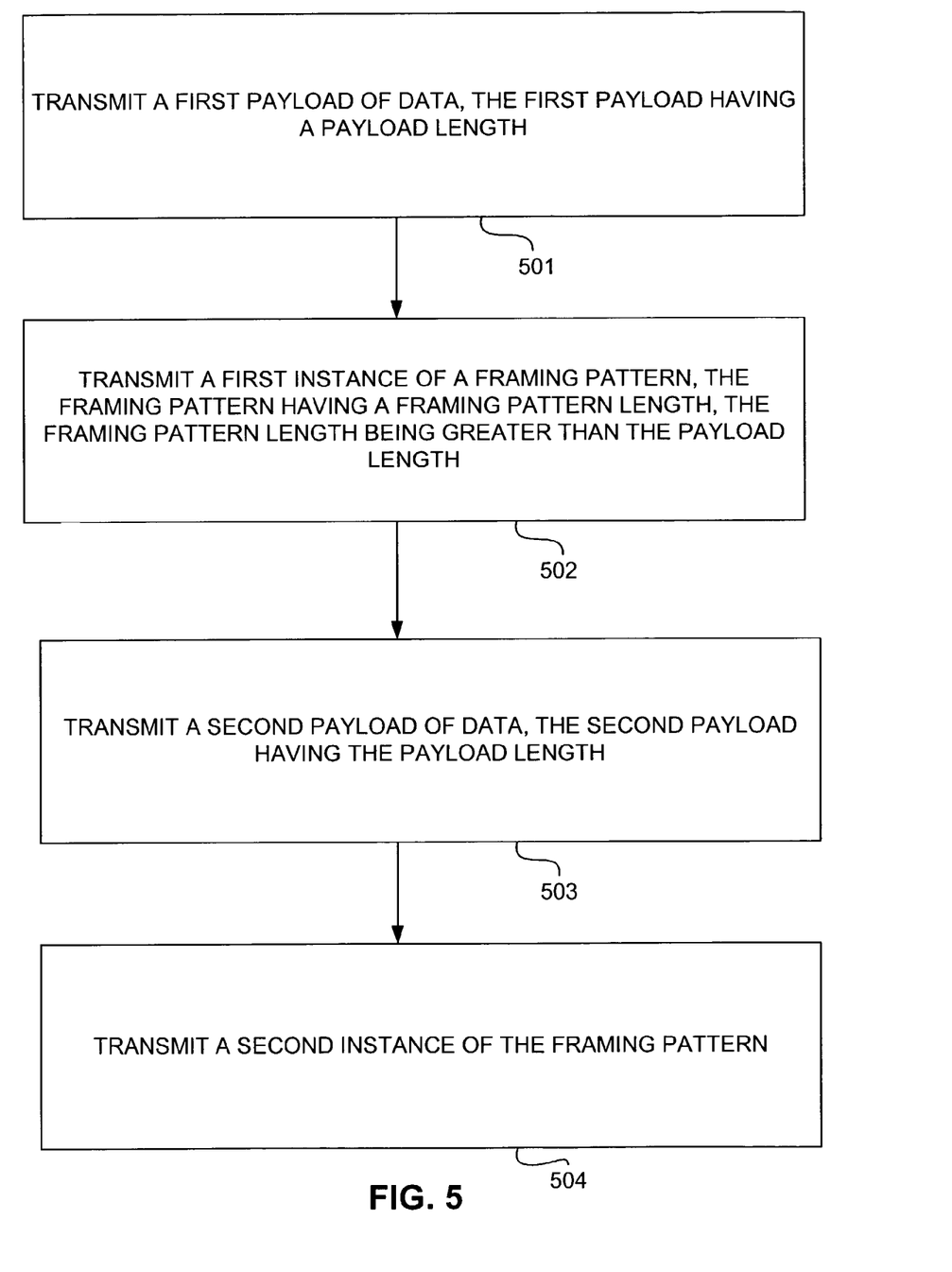
FIG. 5 is a flow diagram illustrating a method for transmitting data in accordance with an embodiment of the invention.

FIG. 5 is a flow diagram illustrating a method for transmitting data in accordance with an embodiment of the invention. In step 501, a first payload of data having a payload length is transmitted. In step 502, a first instance of a framing pattern having a framing pattern length is transmitted. The framing pattern length is greater than the payload length. In step 503, a second payload of data having the payload length is transmitted. In step 504, a second instance of the framing pattern having the framing pattern length is transmitted.

Figure 6:
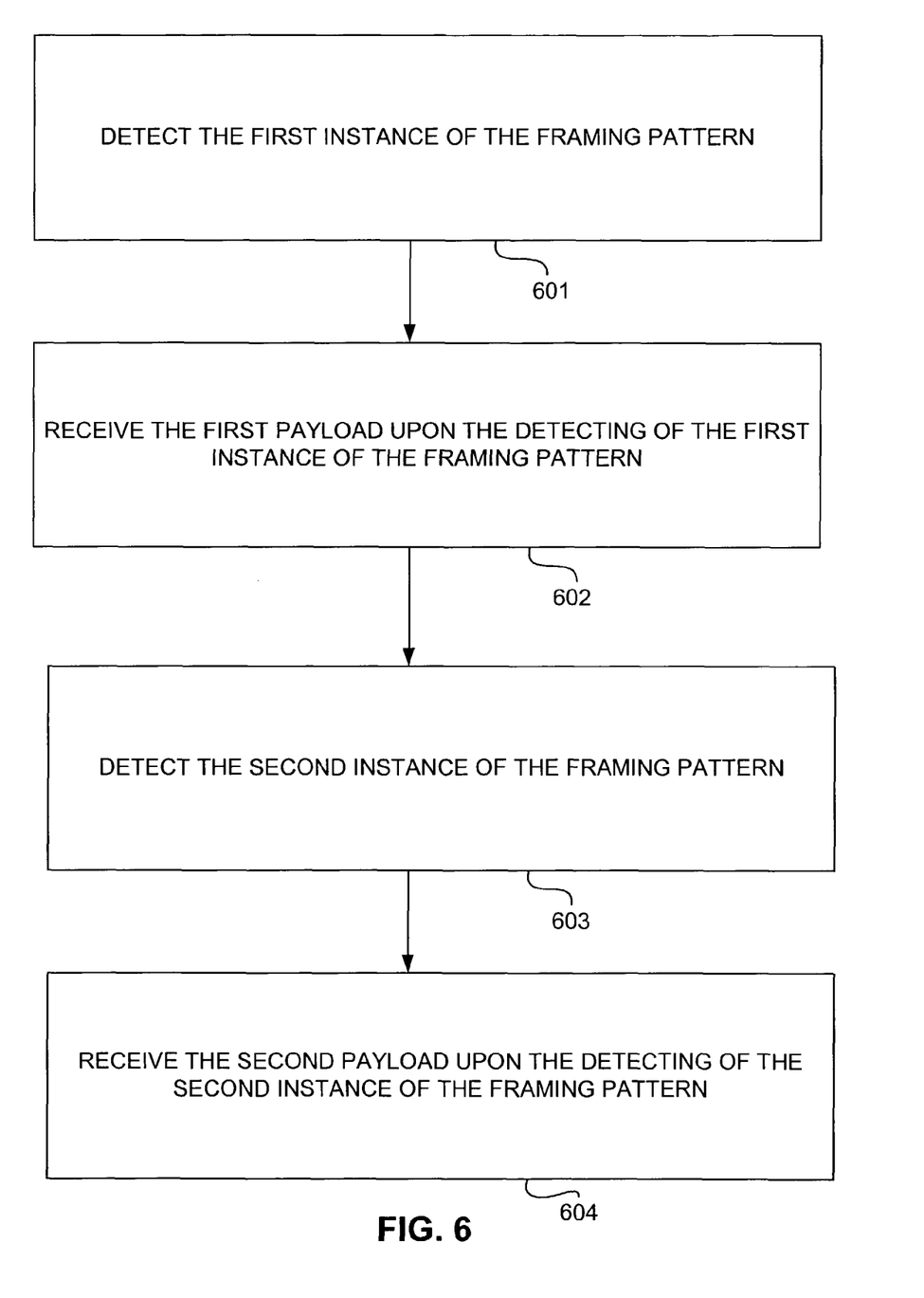
FIG. 6 is a flow diagram illustrating additional steps that may be implemented in the method for transmitting data illustrated in FIG. 5 in accordance with an embodiment of the invention.

FIG. 6 is a flow diagram illustrating additional steps that may be implemented in the method for transmitting data illustrated in FIG. 5 in accordance with an embodiment of the invention. In step 601, the first instance of the framing pattern is detected. In step 602, the first payload is received upon detecting of the first instance of the framing pattern. In step 603, the second instance of the framing pattern is detected. In step 604, the second payload is received upon detecting of the second instance of the framing pattern. As an example of a temporal relationship between the steps of FIGS. 5 and 6, step 601 may follow step 502, step 602 may follow step 501, step 603 may follow step 504, and step 604 may follow step 503.

Accordingly, a method and apparatus for synchronous communication of frames of digital information has been described. It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method for communicating data comprising the steps of:
    transmitting a data signal, the data signal including frames, each frame including:
        only one of a plurality of payloads of the data, and
        a contiguous framing pattern, the contiguous framing pattern having a framing pattern length greater than a payload length of each of the plurality of the payloads of the data, the contiguous framing pattern having only a single logic level transition within the contiguous framing pattern; and
    transmitting a clock signal, the clock signal allowing synchronous sampling of the data signal.

2. The method of claim 1 wherein the contiguous framing pattern is identical for each frame of the data signal.

3. The method of claim 2 wherein the plurality of payloads are not identical for each frame of the data signal.

4. The method of claim 1 wherein the payload length is equal for each of the frames.

5. The method of claim 4 wherein the framing pattern length is equal for each of the frames.

6. The method of claim 5 wherein the payload length is n bits and the framing pattern length is at least n+1 bits.

7. The method of claim 6 wherein the contiguous framing pattern includes one bit of a first polarity and n bits of a second polarity.

8. The method of claim 7 wherein the n bits of the second polarity are contiguous.

9. The method of claim 8 wherein the one bit of the first polarity is contiguous with the n bits of the second polarity.

10. The method of claim 9 wherein the contiguous framing pattern of a first frame is contiguous with the one of the plurality of the payloads of the data of the first frame and with another one of the plurality of the payloads of the data of a second frame.

11. The method of claim 6 wherein the contiguous framing pattern includes a contiguous first number of bits of a first polarity followed contiguously by a contiguous second number of bits of a second polarity.

12. The method of claim 11 wherein the framing pattern length is equal to the sum of the first number of bits and the second number of bits.

13. The method of claim 11 wherein the contiguous framing pattern of a first frame is contiguous with the one of the plurality of the payloads of the data of the first frame and with another one of the plurality of the payloads of the data of a second frame.

14. The method of claim 11 wherein the contiguous first number of bits of the first polarity are contiguous logical 1 bits and the contiguous second number of bits of the second polarity are contiguous logical 0 bits.

15. The method of claim 11 wherein the contiguous first number of bits of the first polarity are contiguous logical 0 bits and the contiguous second number of bits of the second polarity are contiguous logical 1 bits.

16. A method for communicating data comprising the steps of:
    transmitting a first payload of the data, the first payload having a payload length; and
    transmitting a first instance of a contiguous framing pattern, the contiguous framing pattern having a framing pattern length, the framing pattern length being greater than the payload length, the first instance of the contiguous framing pattern having only a single logic level transition within the first instance of the contiguous framing pattern.

17. The method of claim 16 further comprising the steps of:
- transmitting a second payload of the data, the second payload having the payload length; and
- transmitting a second instance of the contiguous framing pattern.

18. The method of claim 17 wherein the contiguous framing pattern includes one bit of a first polarity and n bits of a second polarity.

19. The method of claim 18 wherein the n bits of the second polarity are contiguous.

20. The method of claim 19 wherein the first payload, the first instance of the contiguous framing pattern, the second payload, and the second instance of the contiguous framing pattern are contiguous.

21. The method of claim 17 further comprising the steps of:
- detecting the first instance of the contiguous framing pattern;
- receiving the first payload upon the detecting of the first instance of the contiguous framing pattern;
- detecting the second instance of the contiguous framing pattern; and
- receiving the second payload upon the detecting of the second instance of the contiguous framing pattern.

22. The method of claim 17 wherein the first instance of the contiguous framing pattern includes a contiguous first number of bits of a first polarity followed contiguously by a contiguous second number of bits of a second polarity.

23. The method of claim 22 wherein the first instance of the framing pattern length is equal to the sum of the first number of bits and the second number of bits.

24. The method of claim 22 wherein the first payload, the first instance of the contiguous framing pattern, the second payload, and the second instance of the contiguous framing pattern are contiguous.

25. The method of claim 22 wherein the contiguous first number of bits of the first polarity are contiguous logical 1 bits and the contiguous second number of bits of the second polarity are contiguous logical 0 bits.

26. The method of claim 22 wherein the contiguous first number of bits of the first polarity are contiguous logical 0 bits and the contiguous second number of bits of the second polarity are contiguous logical 1 bits.

27. A transmitter for transmitting frames of data, the transmitter comprising:
- a payload transmission circuit for accepting a payload of the data to be transmitted, the payload including a plurality of payload bits, and for causing the payload bits to be transmitted during payload time slots; and
- a framing pattern transmission circuit coupled to the payload transmission circuit, the framing pattern transmission circuit for causing a contiguous framing pattern to be transmitted during framing pattern time slots, the contiguous framing pattern having a framing pattern length greater than a payload length of the payload, the contiguous framing pattern having only a single logic level transition within the contiguous framing pattern.

28. The transmitter of claim 27 further comprising:
a merging circuit, the merging circuit coupling the payload transmission circuit and the framing pattern transmission circuit, the merging circuit merging the payload and the contiguous framing pattern to provide a data signal.

29. The transmitter of claim 27 wherein the payload transmission circuit includes a plurality of combinational logic devices.

30. The transmitter of claim 29 wherein the framing pattern transmission circuit includes a first plurality of sequential logic devices.

31. The transmitter of claim 30 wherein the payload transmission circuit further includes a second plurality of sequential logic devices.

32. The transmitter of claim 31 wherein the merging circuit includes a combinational logic device.

33. The transmitter of claim 32 wherein the first plurality of sequential logic devices and the second plurality of sequential logic devices are configured as a shift register.

34. The transmitter of claim 33 wherein a shift register output of the shift register is coupled to a shift register input of the shift register.

35. A receiver for receiving frames of data, the receiver comprising:
- a payload reception circuit for receiving a payload of the data from a data signal, the payload including a plurality of payload bits communicated during payload time slots; and
- a framing pattern reception circuit coupled to the payload reception circuit, the framing pattern reception circuit for receiving a contiguous framing pattern from the data signal during framing pattern time slots, the contiguous framing pattern having a framing pattern length greater than a payload length of the payload, the contiguous framing pattern having only a single logic level transition within the contiguous framing pattern.

36. The receiver of claim 35 further comprising:
a payload output circuit coupled to the payload reception circuit and to the framing pattern reception circuit, the payload output circuit outputting the payload upon reception of the contiguous framing pattern and the payload.

37. The receiver of claim 36 wherein the payload reception circuit includes a first plurality of sequential logic devices.

38. The receiver of claim 37 wherein the framing pattern reception circuit includes a second plurality of sequential logic devices.

39. The receiver of claim 38 wherein the framing pattern reception circuit further includes a combinational logic device.

40. The receiver of claim 39 wherein the payload output circuit includes a third plurality of sequential logic devices.

41. The receiver of claim 40 wherein the first plurality of sequential logic devices and the second plurality of sequential logic devices are configured as a shift register.

42. The receiver of claim 41 further comprising:
an error detection circuit coupled to the payload reception circuit and to the framing pattern reception circuit, the error detection circuit for detecting an error condition.

43. The receiver of claim 42 wherein the error detection circuit provides a too many ones error indication upon detection of too many logical ones.

44. The receiver of claim 43 wherein the error detection circuit provides a too many zeros error indication upon detection of too many logical zeros.

45. A system for communication of frames of data, the system comprising:
- a clock generator for generating a clock signal;
- a transmitter coupled to the clock generator for transmitting a data signal including a contiguous framing pattern and a payload of the data, a single instance of the contiguous framing pattern having only a single logic level transition within the single instance of the contiguous framing pattern, wherein a single instance of the payload of the data can never contain sufficient information to mimic the single instance of the contiguous framing pattern;

a bus including a first conductor and a second conductor, the first conductor coupled to the transmitter and the second conductor coupled to the clock generator, the first conductor for communicating the data signal and the second conductor for communicating the clock signal; and a receiver coupled to the first conductor and to the second conductor for receiving the data signal, identifying the contiguous framing pattern, and providing a data output based on the payload.

46. The system of claim 45 wherein the clock signal is synchronous to the data signal.

47. The system of claim 45 wherein the contiguous framing pattern is temporally contiguous and the payload is temporally contiguous.

48. The system of claim 45 wherein the contiguous framing pattern has a framing pattern length greater than a payload length of the payload.

49. The system of claim 48 wherein the contiguous framing pattern consists of one bit of a first logic level and remaining bits of a second logic level.

50. The system of claim 49 wherein the remaining bits are temporally contiguous.

51. The system of claim 50 wherein the one bit precedes the remaining bits.

52. The system of claim 50 wherein the one bit follows the remaining bits.

53. The system of claim 48 wherein the contiguous framing pattern includes a contiguous first number of bits of a first polarity followed contiguously by a contiguous second number of bits of a second polarity.

54. The system of claim 53 wherein the framing pattern length is equal to the sum of the first number of bits and the second number of bits.

55. The system of claim 53 wherein the contiguous first number of bits of the first polarity are contiguous logical 1 bits and the contiguous second number of bits of the second polarity are contiguous logical 0 bits.

56. The system of claim 53 wherein the contiguous first number of bits of the first polarity are contiguous logical 0 bits and the contiguous second number of bits of the second polarity are contiguous logical 1 bits.

* * * * *